(No Model.)
G. LINDENTHAL.
SUSPENSION BRIDGE.
No. 430,428. Patented June 17, 1890.
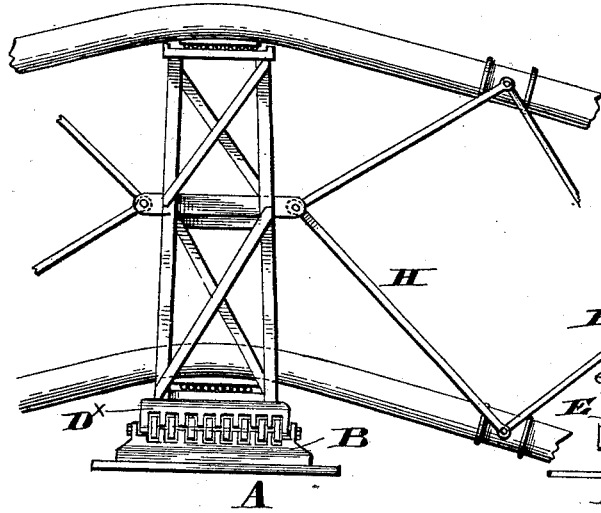
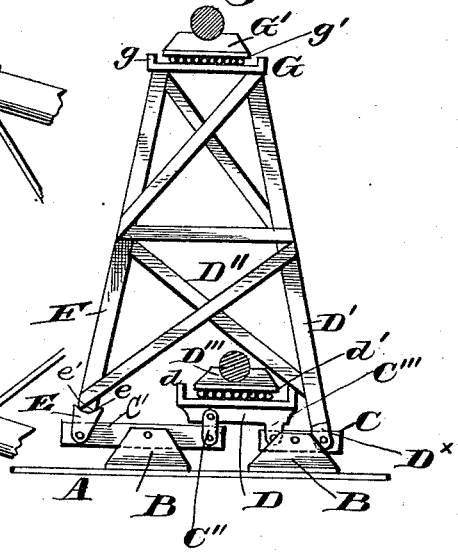
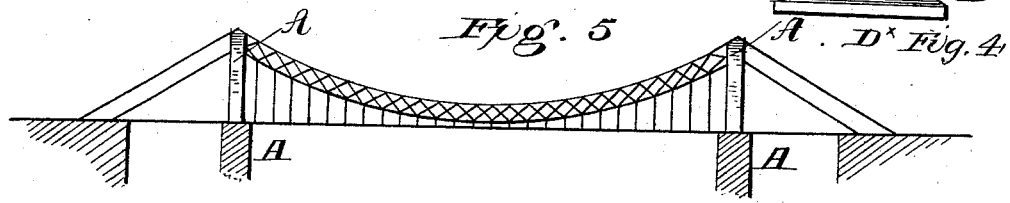
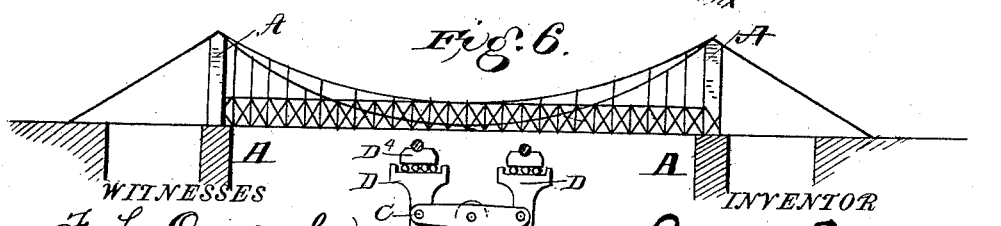
WITNESSES
F. L. Ourand
Alex Mahon
INVENTOR
Gustav Lindenthal
By S. M. Finsabaugh
Attorney

UNITED STATES PATENT OFFICE.

GUSTAV LINDENTHAL, OF PITTSBURG, PENNSYLVANIA.

SUSPENSION-BRIDGE.

SPECIFICATION forming part of Letters Patent No. 430,428, dated June 17, 1890.

Application filed January 23, 1890. Serial No. 337,806. (No model.)

*To all whom it may concern:*

Be it known that I, GUSTAV LINDENTHAL, a citizen of the United States, residing at Pittsburg, in the county of Allegheny and State of Pennsylvania, have invented new and useful Improvements in Suspension-Bridges; and I do hereby declare the following to be a full, clear, and exact description of said invention, reference being had to the accompanying drawings, and to the letters of reference marked thereon, which form a part of this specification.

My invention relates to improvements in the means of supporting cables in the towers of suspension-bridges; and the object of my invention is to prevent the unequal loading of so-called "double cables," and to cause them to carry their equal share of the load at all times; and to this end my invention consists in mounting or passing the double cables in or over bearings or supports made movable relative to each other, whereby the contraction or expansion of one cable will act to take up or slacken the other cable, and consequently cause the cables to maintain their proper tension relative to each other, all as hereinafter described.

In the accompanying drawings, Figure 1 is a side view of the upper portion of a bridge-tower, showing the cables passing through the tower and extending from tower to tower at equal distances apart and connected by suitable truss-rods or struts or diagonal rods, and having the flooring supported by rods or hangers depending from the cables. Fig. 2 is a face view of the same, showing the cables in section. Fig. 3 is a side view of the top of the tower, in which the lower and banister cables pass over the upper part of the tower side by side, or parallel with each other. Fig. 4 is a face view of the same, and Figs. 5 and 6 are side views of the two forms of the single-span bridge complete.

The supports or towers A may be built in any preferred way, and when the bridge is constructed as shown in Fig. 1 the towers have mounted upon and secured to the top thereof slotted heads B, with the slots arranged at right angles to the line of the cables. These heads are arranged at suitable distances apart, and have pivotally mounted in each of the slots a rocking arm or bar C C', the inner ends of each of which bars are connected to a block D, one of the series of arms C' being connected to the block by means of links C'', while the other series of arms C are connected to the block through depending lugs C''', formed with or otherwise secured to the lower side of the head. To the outer ends of the series of arms C is connected a slotted foot-piece $D^x$, formed with or otherwise secured to uprights D', and the outer ends of the arms C' are provided with bearing-lugs E, having a curved bearing-face $e$, in which a curved bearing-bar $e'$, connected to or formed with the lower ends of uprights F, rests, the uprights D' and F being connected together and braced by diagonal rods D'' in any preferred way.

The upper ends of the uprights D' and F have mounted thereon and secured thereto a block G, which block G, as also the block D before referred to, form seats or rests for the saddles D''' and G', over which the cables pass. The blocks D and G are provided with upwardly-projecting flanges $d\,g$, and between the blocks and saddles are placed friction balls or rollers $d'\,g'$, which are held by means of the flanges $d$ and $g$. The saddles D''' and G' are usually provided on their upper faces with semicircular grooves to receive the cables; but the cables may be embedded into the saddle in any other suitable manner.

The cables in the construction above described extend throughout their lengths at equal distances apart and are connected together by suitable diagonal ties or braces H, and when used in a single-span bridge are as shown in Fig. 5. When the lower and banister cables pass over the top of the tower side by side, as shown in Figs. 3, 4, and 6, a single slotted head B is employed, and two series of rocking arms or bars C, which are pivoted centrally of their length in the slots of the head B, and having connected to their outer ends blocks D, in which the saddles $D^4$ are mounted, the blocks D being provided with upwardly-projecting flanges and with balls or rollers interposed between the blocks and saddles, as before described, the upper set of arms C carrying and the lower set serving to steady the load.

The cables may be either formed of wire or wire ropes or of eyebars or other suitable construction, from which the platform for the roadway is suspended, as before stated, in any preferred manner.

The action of the cables and their supporting-towers is as follows: As is well known, in cold weather the cables will shorten, and as a consequence the upper cable will carry more than the lower one, and when the temperature rises, or in warm weather, the case will be reversed—the lower cable will carry the greater part of the suspended load; but with the construction of tower as above described whenever the upper cable has a greater load it will exert greater pressure on its support, which will, as a consequence, be forced down or caused to sink, and acting through the arms connecting it with the block, on which is supported the saddle of the lower cable, will force the same upward or cause it to rise until both cables have the same reaction, the action being the same as in a weighing-scale for both constructions shown in the drawings.

Having now described my invention, I claim—

1. In a suspension-bridge, the saddles for supporting the cables or arch members, mounted in bearings or supports made movable and balancing relative to each other, substantially as set forth.

2. In a suspension-bridge, the tower having the bearings for the cables or arch members, connected together through yielding connections and having the saddles mounted in said bearings with the interposed friction balls or rollers, substantially as set forth.

In testimony whereof I affix my signature in the presence of two subscribing witnesses.

GUSTAV LINDENTHAL.

Witnesses:
G. A. HILLEMANN,
W. T. McCULLOUGH.